United States Patent
Miyachi et al.

(10) Patent No.: US 10,471,382 B2
(45) Date of Patent: Nov. 12, 2019

(54) AIR POLLUTION CONTROL SYSTEM

(71) Applicant: MITSUBISHI HITACHI POWER SYSTEMS, LTD., Yokohama-shi, Kanagawa (JP)

(72) Inventors: Tsuyoshi Miyachi, Tokyo (JP); Seiji Kagawa, Tokyo (JP); Naoyuki Kamiyama, Tokyo (JP); Tetsu Ushiku, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/086,477

(22) PCT Filed: Feb. 21, 2017

(86) PCT No.: PCT/JP2017/006430
§ 371 (c)(1),
(2) Date: Sep. 19, 2018

(87) PCT Pub. No.: WO2017/169310
PCT Pub. Date: Oct. 5, 2017

(65) Prior Publication Data
US 2019/0099714 A1 Apr. 4, 2019

(30) Foreign Application Priority Data

Mar. 30, 2016 (JP) .................. 2016-068414

(51) Int. Cl.
*B01D 53/34* (2006.01)
*B01D 53/60* (2006.01)
(Continued)

(52) U.S. Cl.
CPC ........... *B01D 53/50* (2013.01); *B01D 53/501* (2013.01); *B01D 53/58* (2013.01); *B01D 53/76* (2013.01);
(Continued)

(58) Field of Classification Search
None
See application file for complete search history.

(56) References Cited

U.S. PATENT DOCUMENTS

| 7,507,381 B2 | 3/2009 | Muramoto et al. |
| 8,568,673 B2 | 10/2013 | Kagawa et al. |
| 2013/0101487 A1 | 4/2013 | Kagawa et al. |

FOREIGN PATENT DOCUMENTS

| CN | 1708658 A | 12/2005 |
| CN | 1745878 A | 3/2006 |

(Continued)

OTHER PUBLICATIONS

Nishiyama et al. JP-11333251-A—translated document (Year: 1999).*
(Continued)

*Primary Examiner* — Jelitza M Perez
(74) *Attorney, Agent, or Firm* — Westerman, Hattori, Daniels & Adrian, LLP

(57) ABSTRACT

An air pollution control system includes a denitration device that removes nitrogen oxide in flue gas from a boiler; a heat transfer tube for recovering part of heat of the flue gas after denitration; a precipitator that removes soot and dust in the flue gas after heat recovery; a desulfurization device that removes sulfur oxide in the flue gas discharged from the precipitator; a heat transfer tube for heating the flue gas discharged from the desulfurization device; a circulation pump that circulates a heat medium between the heat transfer tubes; a heat medium heater provided to the circulation pipe to heat the heat medium; and a control device that controls the heat medium heater based on an ammonia concentration at an outlet of the denitration device. The control device causes the heat medium heater to heat the heat medium when the ammonia concentration is higher than a certain value.

5 Claims, 9 Drawing Sheets

(51) Int. Cl.

| | | |
|---|---|---|
| *B01D 53/76* | (2006.01) | |
| *B01D 53/50* | (2006.01) | |
| *B01D 53/78* | (2006.01) | |
| *B01D 53/90* | (2006.01) | |
| *B03C 3/019* | (2006.01) | |
| *F23J 15/08* | (2006.01) | |
| *B01D 53/86* | (2006.01) | |
| *F23J 15/00* | (2006.01) | |
| *B03C 3/017* | (2006.01) | |
| *B01D 53/58* | (2006.01) | |
| *F23J 15/02* | (2006.01) | |
| *F23J 15/06* | (2006.01) | |

(52) U.S. Cl.
CPC ......... *B01D 53/78* (2013.01); *B01D 53/869* (2013.01); *B01D 53/8609* (2013.01); *B01D 53/8631* (2013.01); *B01D 53/90* (2013.01); *B03C 3/017* (2013.01); *B03C 3/019* (2013.01); *F23J 15/003* (2013.01); *F23J 15/006* (2013.01); *F23J 15/025* (2013.01); *F23J 15/06* (2013.01); *F23J 15/08* (2013.01); *B01D 2251/2062* (2013.01); *B01D 2251/502* (2013.01); *B01D 2258/0283* (2013.01); *F23J 2211/00* (2013.01); *F23J 2215/10* (2013.01); *F23J 2215/20* (2013.01); *F23J 2217/102* (2013.01); *F23J 2219/10* (2013.01); *F23J 2900/15081* (2013.01)

(56) References Cited

FOREIGN PATENT DOCUMENTS

| CN | 102959386 A | | 3/2013 | |
|---|---|---|---|---|
| JP | 9-122438 A | | 5/1997 | |
| JP | 9-122439 A | | 5/1997 | |
| JP | 11-333251 A | | 12/1999 | |
| JP | 11333251 A | * | 12/1999 | |
| JP | 2001-334129 A | | 12/2001 | |
| JP | 2011-200781 A | | 10/2011 | |
| JP | 2011200781 A | * | 10/2011 | |
| JP | 2012-149792 A | | 8/2012 | |
| JP | 2013-119982 A | | 6/2013 | |
| JP | 2013-119983 A | | 6/2013 | |
| JP | 2013119983 A | * | 6/2013 | ............... F23J 15/08 |
| WO | 2011/142376 A1 | | 11/2011 | |
| WO | 2012/043411 A1 | | 4/2012 | |

OTHER PUBLICATIONS

Kobayashi et al. JP2011-200781A—translated document (Year: 2011).*

Kamiyama et al. (JP2013-119983A)—translated document (Year: 2013).*

International Search Report dated Apr. 25, 2017, issued in counterpart International Application No. PCT/JP2017/006430, with English translation. (21 pages).

Office Action dated Apr. 3, 2019, issued in counterpart CN Application No. 201780018855.9, with English translation. (10 pages).

* cited by examiner

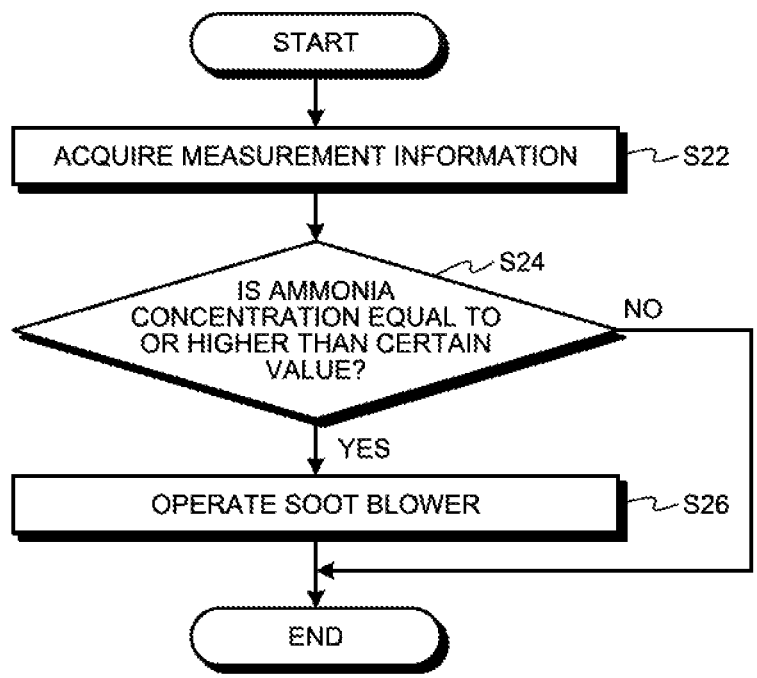

AIR POLLUTION CONTROL SYSTEM

FIELD

The present invention relates to air pollution control systems. Specifically, the invention relates to an air pollution control system that includes desulfurization device performing desulfurization processing on flue gas from a boiler, for example, recovers heat of flue gas on an upper stream side of the desulfurization device, reheats flue gas discharged from the desulfurization device on a downstream side of the desulfurization device by the recovered heat, and discharges the reheated flue gas from a stack, for example.

BACKGROUND

A technique has been developed for efficient use of heat in flue gas from a thermal power generation boiler. In the technique, heat in boiler flue gas is recovered by a heat recovery unit of a gas-gas heater (GGH) and flue gas to be discharged externally from a stack is heated by a reheater of the GGH. The heat recovery unit is installed on the downstream side of an air preheater in an air pollution control facility for the thermal power generation boiler. The heat recovery unit reduces a temperature of flue gas from a temperature of around 140° C. to around 95° C., for example, to maintain a soot and dust collection efficiency of a low-temperature electronic precipitator. After soot and dust are collected by the electronic precipitator, the flue gas is introduced into a desulfurization device that removes sulfur oxide in the flue gas, and the flue gas is then discharged externally from the stack. The flue gas to be externally discharged is heated by the reheater installed on the downstream side of the desulfurization device using heat recovered by the heat recovery unit to prevent white smoke from being discharged from a stack outlet, and the inside of a flue gas duct from being corroded (refer to Patent Literature 1). In controlling the heat recovery unit and the reheater, a flue gas temperature is measured at an outlet of the heat recovery unit so as to increase soot and dust collection performance of the electronic precipitator and a heating medium temperature is measured at an outlet of the reheater so as to prevent a heat transfer tube of the reheater from being corroded, for example.

An operation control system has been developed for the case where ammonia denitration using ammonia is performed for removing nitrogen oxide in flue gas. The operation control system includes a detection means that detects states of operation parameters relating to production of ammonium chloride contained in flue gas flowing in a heat recovery unit; an analysis device analyzes data detected by the detection means and detects a state of the heat recovery unit to perform operation control (refer to Patent Literature 2).

CITATION LIST

Patent Literature

Patent Literature 1: Japanese Patent Application Laid-open No. H9-122438
Patent Literature 2: Japanese Patent Application Laid-open No. 2013-119982

SUMMARY

Technical Problem

When catalytic performance is not demonstrated due to deterioration caused by long-time use of a denitration catalyst in a denitration device, operation is performed to increase an ammonia ($NH_3$) concentration. As a result, an ammonia slip concentration at an outlet of the denitration device is increased. The ammonia slip and a chloride component contained in boiler fuel produce ammonium chloride ($NH_4Cl$) in a gas low temperature region (e.g., 95° C. to 110° C. The produced ammonium chloride sticks to a heat transfer tube in the heat recovery unit, and may thereby cause an increased gas differential pressure or corrosion of the heat transfer tube.

Techniques are, thus, much needed that preliminarily prevent an increase in gas differential pressure due to the sticking of ammonium chloride to the heat transfer tube in the heat recovery unit.

In view of the problem described above, the invention aims to provide an air pollution control system that can preliminarily prevent an increase in gas differential pressure due to sticking of ammonium chloride to the heat transfer tube in the heat recovery unit.

Solution to Problem

To solve the problem described above, a first invention of the present invention is an air pollution control system. The air pollution control system includes a denitration device configured to remove nitrogen oxide in flue gas from a boiler; a heat recovery unit including a heat transfer tube for recovering part of heat of the flue gas after denitration; a precipitator configured to remove soot and dust in the flue gas after heat recovery; a desulfurization device configured to remove sulfur oxide in the flue gas discharged from the precipitator; a reheater including a heat transfer tube for heating the flue gas discharged from the desulfurization device; a heat medium circulation pipe including a heat medium circulation pump configured to circulate a heat medium between the heat transfer tube of the heat recovery unit and the heat transfer tube of the reheater; a heat medium heater provided to the heat medium circulation pipe to heat the heat medium; a detection device configured to detect a state of ammonia at an outlet of the denitration device; and a control device configured to control the heat, medium heater based on a value of an ammonia concentration detected by the detection device. The control device is configured to cause the heat, medium heater to heat the heat medium when the ammonia concentration is equal to or higher than a certain value.

According to this invention, when the ammonia concentration is equal to or higher than the certain value, the heat medium heater heats the heat medium to increase the temperature of the heat medium circulated and introduced into the heat recovery unit. The flue gas temperature in the heat recovery unit is, thus, increased from that before the heat medium heater heats the heat medium. The resulting temperature is in a temperature region where ammonium chloride is in a gas state, thereby preventing the production of solid ammonium chloride. As a result, solid ammonium chloride is prevented from sticking to the heat transfer tube.

A second invention is the air pollution control system according to the first invention, and the detection device obtains an ammonia concentration in the flue gas at the outlet of the denitration device.

According to this invention, the ammonia concentration in the flue gas at the outlet of the denitration device is obtained. When the ammonia concentration is equal to or higher than the certain value, which may cause solid ammonium chloride to be formed, the air pollution control system prevents production of the solid.

A third invention is the air pollution control system according to the first invention, and the detection device obtains an input amount of ammonia to be supplied to the denitration device.

According to this invention, an amount of ammonia slip is estimated from the input amount of ammonia.

A fourth invention is the air pollution control system according to the first invention, and the detection device detects a switching of a setting value for inputting ammonia into the flue gas.

According to this invention, an amount of ammonia slip is estimated by detecting timing at which the setting value of the input amount of ammonia is switched from that in normal operation.

A fifth invention is the air pollution control system according to the first invention, and further includes a soot and dust removal device configured to remove soot and dust sticking to the heat transfer tube of the heat recovery unit. The control device commands operation of the soot and dust removal device while controlling the heat medium heater.

According to this invention, the soot and dust removal device is operated, thereby making it possible to remove ammonium chloride sticking to the heat transfer tube.

A sixth invention is the air pollution control system according to the first invention, and further includes a thermometer configured to measure a temperature of the flue gas at an outlet of the heat recovery unit. The control device controls the heat medium heater such that a temperature of the flue gas flowing into the precipitator is an appropriate operating temperature of the precipitator.

According to this invention, the heat medium is heated by the heat medium heater, resulting in the temperature of the heat medium introduced into the heat recovery unit being increased. When the low temperature precipitator having an upper limit operating temperature is used, the heat medium heater is controlled such that the temperature of the heat medium is equal to or lower than the upper limit operating temperature.

Advantageous Effects of Invention

According to the present invention, when an ammonia concentration is equal to or higher than a certain value, the heat medium heater heats the heat medium to increase the temperature of the heat medium circulated and introduced into the heat recovery unit. The flue gas temperature in the heat recovery unit is, thus, increased from that before the heat medium heater heats the heat medium. The resulting temperature is in a temperature region where ammonium chloride is in a gas state, thereby preventing the production of solid ammonium chloride. As a result, solid ammonium chloride is prevented from sticking to the heat transfer tube.

BRIEF DESCRIPTION OF DRAWINGS

FIG. 10 is a flowchart illustrating another example of the control operation of the air pollution control system.

DESCRIPTION OF EMBODIMENTS

The following describes preferred embodiments of the invention in detail with reference to the accompanying drawings. The embodiments do not limit the invention. When multiple embodiments are available, the embodiments include those obtained by combining the respective embodiments.

First Embodiment

Figure 1:
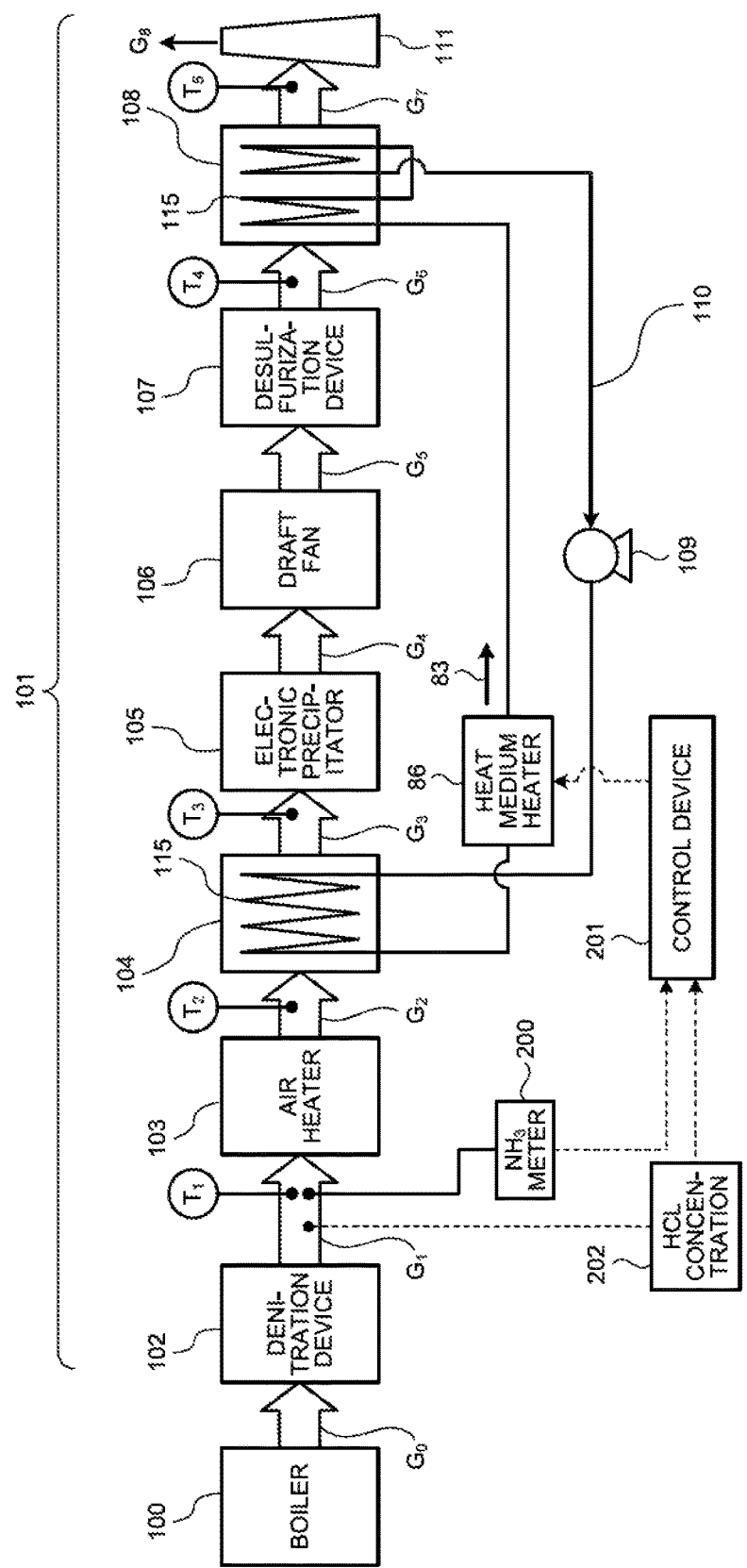
FIG. 1 is a schematic diagram illustrating an air pollution control system according to a first embodiment.

FIG. 1 is a schematic diagram of an air pollution control system according to a first embodiment. As illustrated in FIG. 1, a power generation unit includes a boiler 100 that burns fuel and an air pollution control system 101 that processes flue gas discharged from the boiler 100. The boiler 100 burns fuel and the like to produce heated gas. A mechanism that converts thermal energy into power absorbs heat from gas heated by the boiler 100. The gas from which heat has been absorbed is discharged to the air pollution control system 101 as the flue gas.

The air pollution control system 101 removes nitrogen oxide (NOx), soot and dust, and sulfur oxide (SOx) that are included in the flue gas in its process in which the flue gas discharged from the boiler 100 is released from a stack 111. The air pollution control system 101 includes a denitration device 102, an air heater 103, a heat recovery unit 104 of a gas-gas heater, an electronic precipitator 105, a draft fan 106, a desulfurization device 107, a reheater 108 of the gas-gas heater, a circulation pump 109, a heat medium circulation pipe 110, and the stack 111. In FIG. 1, $G_0$ to $G_7$ indicate the respective flue gases discharged from the boiler 100 to the stack 111 while $T_1$ to $T_5$ indicate the respective flue gas temperatures.

The flue gas $G_0$ discharged from the boiler 100 is introduced into the denitration device 102 filled with a catalyst. In the denitration device 102, nitrogen oxide contained in the flue gas $G_0$ is reduced into water and nitrogen by ammonia gas ($NH_3$) injected as a reducing agent. The flue gas $G_0$ is, thus, rendered to be harmless.

The flue gas $G_1$ discharged from the denitration device 102 passes through the air heater (AH) 103, and is cooled to, generally, a temperature from 130° C. to 150° C. (preferably from 135° C. to 140° C.).

After passing through the air heater 103, the flue gas $G_2$ is introduced into the heat recovery unit 104 of the gas-gas heater. Heat of the flue gas $G_2$ is recovered through heat exchange with a heat medium (e.g., hot water) 83 flowing in the heat transfer tube (e.g., a finned tube) 115 inserted inside the heat recovery unit 104. After passing through the heat recovery unit 104, the flue gas $G_3$ has a temperature, generally, from 85° C. to 120° C. (preferably from 90° C. to 100° C.). The flue gas $G_3$ having such temperature increases soot and dust collection capacity in the electronic precipitator (EP) 105 at a low temperature, for example.

After passing through the heat recovery unit 104, the flue gas $G_3$ is introduced into the electronic precipitator 105, where soot and dust are removed.

After passing through the electronic precipitator 105, pressure of the flue gas $G_4$ is increased by the draft fan 106 driven by an electric motor. The draft fan 106 is not installed in some cases. The draft fan 106 may be installed at a position where the flue gas $G_7$ flows after the gas-gas heater reheater 108, in some cases.

The flue gas $G_5$ having a pressure increased by the draft fan 106 is introduced into the desulfurization device 107. In the desulfurization device 107, sulfur oxide in the flue gas $G_5$ is absorbed and removed by an alkaline or weak alkaline absorbent in which limestone is dissolved in a slurry form, for example. When using an absorbent in which limestone is dissolved in a slurry form, the desulfurization device 107 produces gypsum as a by-product. A temperature of the flue gas $G_6$ after passing through the desulfurization device 107 is reduced to, generally, a temperature of approximately 50° C.

The flue gas $G_6$ after the desulfurization device 107 is introduced into the reheater 108 of the gas-gas heater. The reheater 108 heats the flue gas $G_6$ by heat recovered by the heat recovery unit 104 in a process in which the heat medium 83 is circulated in the paired heat medium circulation pipe 110 by the circulation pump 109. The flue gas $G_6$ having a temperature of about 50° C. at an outlet of the desulfurization device 107 is reheated by the reheater 108 such that the flue gas $G_6$ has a temperature of approximately from 85° C. to 110° C. Thereafter, the flue gas $G_6$ is released into the atmosphere from the stack 111.

Figure 2:
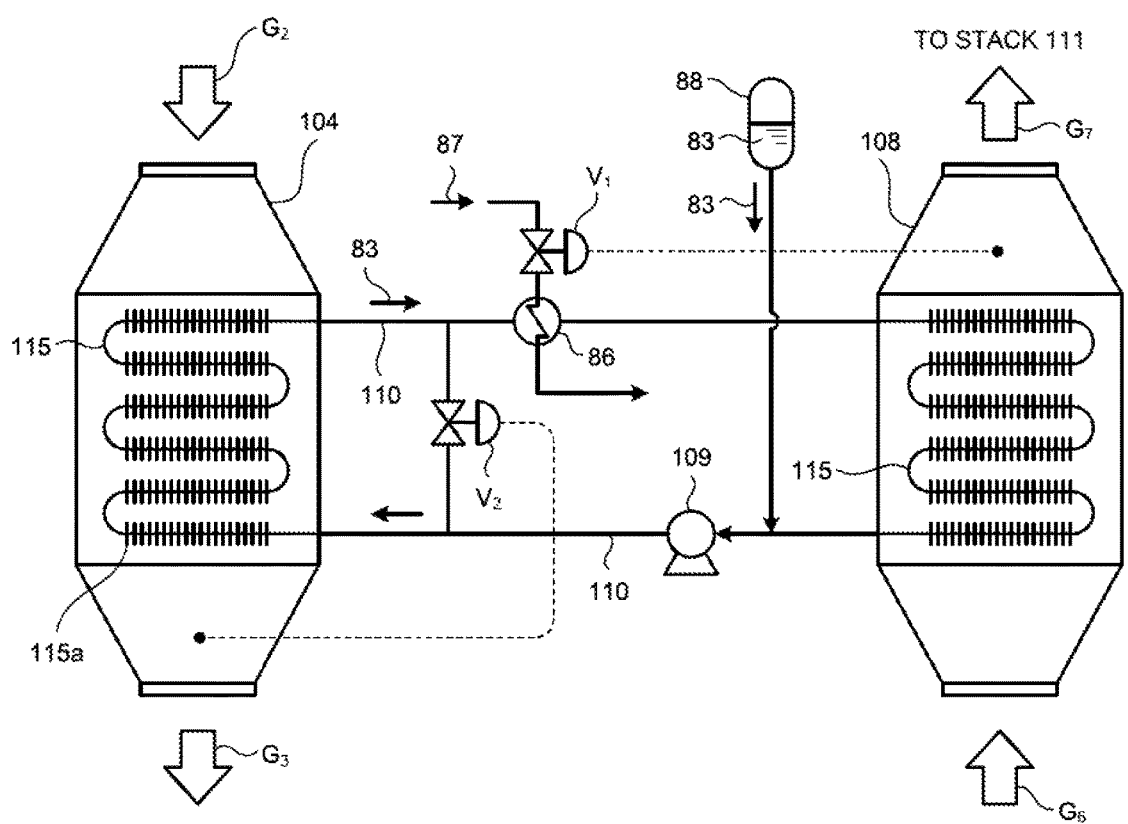
FIG. 2 is an explanatory view illustrating a schematic structure of a heat exchange unit in the air pollution control system.

FIG. 2 is an explanatory view illustrating a schematic structure of a heat exchange unit of the air pollution control system. As illustrated in FIG. 2, the heat exchange unit includes the heat medium circulation pipe 110 in which the heat medium 83 is circulated between the heat recovery unit 104 and the reheater 108. The heat medium 83 is circulated between the heat recovery unit 104 and the reheater 108 through the heat medium circulation pipe 110. A plurality of fins 115a are provided on the heat transfer tube (e.g., finned tube) 115 provided on the surface of the heat medium circulation pipe 110 provided inside each of the heat recovery unit 104 and the reheater 108. The heat medium circulation pipe 110 is provided with a heat medium heater 86. The heat medium heater 86 complements energy equivalent to a reduced temperature of the heat medium 83 due to heat radiation during the circulation by heating the heat medium 83 with steam 87. The heat medium heater 86, thus, can adjust a medium temperature of the heat medium 83.

The heat medium 83 is supplied to the heat medium circulation pipe 110 from a heat, medium tank 88. The heat medium 83 is circulated in the heat medium circulation pipe 110 by the circulation pump 105. A supply of the steam 87 is adjusted by a control valve $V_1$ in accordance with a gas temperature of the flue gas $G_6$ from the desulfurization device 107. The heat medium 83 fed to the reheater 108 is supplied to the heat recovery unit 104 by a control valve $V_2$ in accordance with a gas temperature of the flue gas $G_3$ discharged from the heat recovery unit 104, resulting in a supply of the heat medium 83 fed to the reheater 108 being adjusted. The flue gas $G_7$ discharged from the reheater 108 is supplied to the stack 111. The gas supplied to the stack 111 is discharged externally as the flue gas $G_8$.

The following describes the air pollution control system when ammonia is excessively input into the denitration device and ammonia slip occurs with reference to FIGS. 1 and 2. As illustrated in FIG. 1, the air pollution control system 101 according to the embodiment includes: the denitration device 102 that removes nitrogen oxide in the flue gas $G_0$ discharged from the boiler 100; the air heater 103 that exchanges heat of the flue gas $G_1$ after the denitration with air introduced into the boiler 100; the heat recovery unit 104 including the heat transfer tube 115 that recovers part of heat of the flue gas $G_2$ after the heat exchange; the electronic precipitator 105 that removes soot and dust in the flue gas $G_3$ after the heat recovery; the desulfurization device 107 that removes sulfur oxide in the flue gas $G_5$ discharged from the electronic precipitator 105; the reheater 103 including the heat transfer tube 115 that heats the flue gas $G_6$ discharged from the desulfurization device 107; the heat medium circulation pipe 110 provided with the circulation pump 109 that circulates the heat medium 83 between the heat transfer tube 115 in the heat recovery unit 104 and the heat transfer tube 115 in the reheater 108; the heat medium heater 86 that is provided to the heat medium circulation pipe 110 and heats the heat medium 83; an ammonia ($NH_3$) meter 200, which is a detection device detecting a state of ammonia at the outlet of the denitration device 102; and a control device 201 that, controls the heat medium heater 86 on the basis of a value of the ammonia concentration detected by the ammonia meter 200. The control device 201 causes the heat medium heater 86 to heat the heat medium 83 when the ammonia concentration is equal to or higher than a certain value.

In the embodiment, an ammonia ($NH_3$) concentration at the outlet of the denitration device 102 is measured by the ammonia meter 200. When the catalyst of the denitration device 102 is not deteriorated, an ammonia concentration at the outlet of the denitration device 102 is typically around 1 ppm. When ammonia is excessively injected in the denitration processing due to a reduction in processing capability caused by the deterioration of the denitration catalyst in long time use, an ammonia concentration at the outlet of the denitration device 102 is increased to 10 ppm to 15 ppm or more in some cases. When an increase in ammonia concentration is equal to or higher than a certain value (e.g., 10 ppm to 15 ppm or more), the control device 201 issues a command to input steam 87 into the heat medium heater 86 provided to the heat medium circulation pipe 110 on the outlet side of the heat recovery unit 104. As a result, a temperature of the circulating heat medium 83 is increased, thereby increasing a temperature of the heat transfer tube in the heat, recovery unit 104 of the gas-gas heater. As a result, a gas temperature in the heat recovery unit 104 is increased, thereby preventing the production of ammonium chloride ($NH_4Cl$) and preventing a product caused by ammonium chloride from sticking to the heat, transfer tube 115.

In the embodiment, the temperature of the heat medium heater 86 is adjusted by input of the steam 87. Other than the input of the steam 87, the temperature of the circulating heat medium 83 can be controlled by adjusting the circulation pump 109 that adjusts a flow of the circulating heat medium 83.

Examples of the detection device other than control operation of monitoring by the ammonia meter 200 detecting an ammonia concentration include control operation at timing when the input amount of ammonia is changed or a setting value of input amount of ammonia is changed, and measurement data of an ammonia concentration by manual measurement. When the denitration processing in the denitration device 102 is insufficient, a NOx measurement value of a NOx meter, which is not illustrated, is increased to a value equal to or higher than a specified value. In such a case where the NOx value is increased, an input amount of ammonia or timing for setting input amount of ammonia is changed. When such a change is made, an amount of ammonia slip is estimated and the temperature of the heat medium 83 can be adjusted.

This makes it possible to adjust the heat medium heater 86, to control the temperature of the heat medium circulating in the heat recovery unit 104, to prevent the production of ammonium chloride ($NH_4Cl$), and to prevent ammonium chloride from sticking to the heat transfer tube 115, even in a plant in which the ammonia meter 200 is not installed.

As described above, in the embodiment, the ammonia meter 200 detects an increase in ammonia concentration and the control device 201 adjusts the heat medium heater 86 when the ammonia concentration is equal to or higher than a certain value on the basis of the detection data. This adjustment causes a gas atmosphere temperature in the heat recovery unit 104 to be out of an ammonium chloride production temperature region. As a result, ammonium chloride can be prevented from sticking to the heat transfer tube in the heat recovery unit 104 during plant operation.

Figure 3:
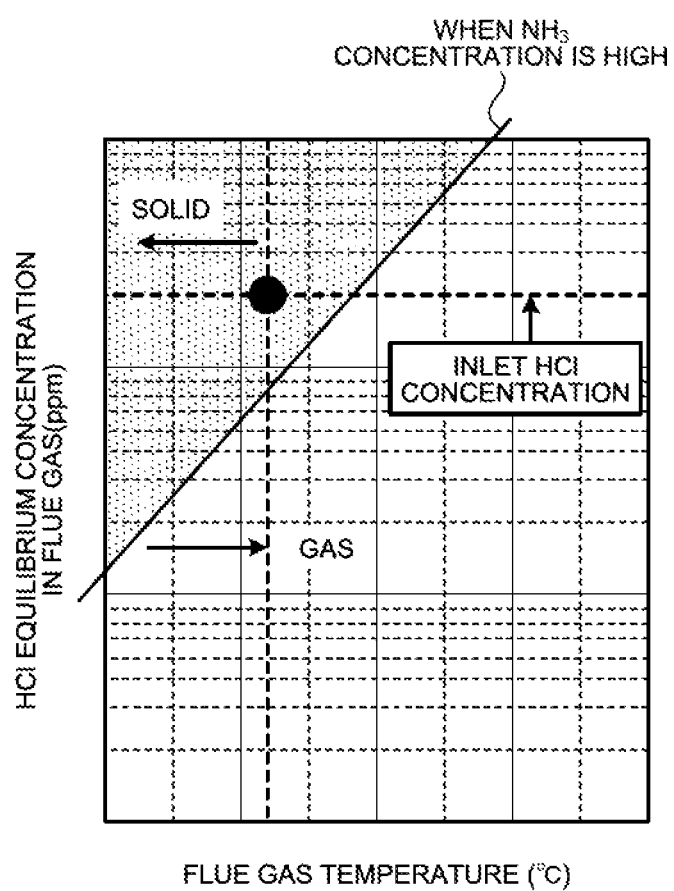
FIG. 3 is a graph indicating whether ammonium chloride is in a solid phase precipitation state or a gas state when an ammonia concentration is high (e.g., 4 ppm or more).
Figure 4:
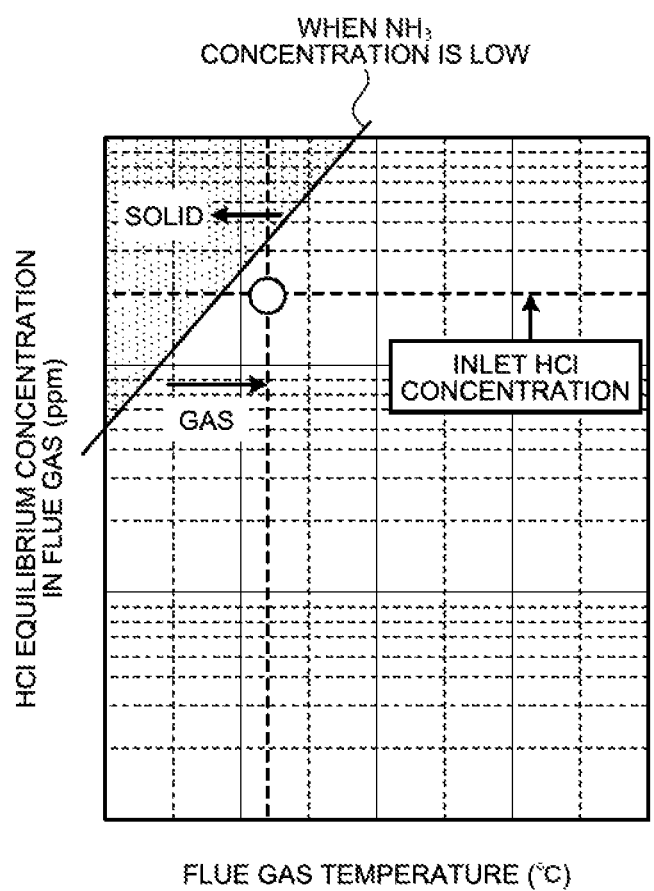
FIG. 4 is a graph indicating whether ammonium chloride is in the solid phase precipitation state or the gas state when the ammonia concentration is low (e.g., 1 ppm or less).

The following describes a relation between a flue gas temperature (° C.) in the heat recovery unit 104 and an equilibrium concentration (ppm) of hydrogen chloride (HCl) in flue gas with reference to FIGS. 3 and 4.

FIG. 3 is a graph indicating whether ammonium chloride is in a solid phase precipitation state or a gas state when the ammonia concentration is high (e.g., 4 ppm or more). FIG. 4 is a graph indicating whether ammonium chloride is in the solid phase precipitation state or the gas state when the ammonia concentration is low (e.g., 1 ppm or less). FIGS. 3 and 4 each illustrate a case where the concentration of hydrogen chloride introduced into the heat recovery unit 104 is an average concentration (e.g., 10 ppm to 20 ppm) in coal combustion plants.

It is known that whether ammonium chloride is in a precipitation state or a non-precipitation state is determined by equilibrium calculation with conditions of an ammonia concentration, a flue gas temperature, and a hydrogen chloride concentration in an equilibrium reaction. As illustrated in FIGS. 3 and 4, in the equilibrium reaction, whether ammonium chloride ($NH_4Cl$) is in the precipitation state or the non-precipitation state is determined by the conditions of the ammonia concentration, the flue gas temperature, and hydrogen chloride (HCl) concentration. Under the conditions that are represented in a region on an upper left, side of the equilibrium curve (solid line), ammonium chloride ($NH_4Cl$) precipitates, while under the conditions that are represented in a region on a lower right, side of the equilibrium curve, ammonia slip and hydrogen chloride (HCl) are in a gas state and, thus, pass through the heat recovery unit 104. As an ammonia concentration is reduced, the solid production region is reduced. The reduction in ammonia concentration further prevents the production of ammonium chloride ($NH_4Cl$).

Specifically, as illustrated in FIG. 3, when the hydrogen chloride concentration at the inlet of the heat recovery unit 104 is the average concentration, the ammonia concentration is high, and the flue gas temperature at the outlet of the heat recovery unit 104 is 90° C. to 95° C., for example, ammonium chloride ($NH_4Cl$) is plotted in the solid region.

In contrast, when the hydrogen chloride concentration at the inlet of the heat recovery unit 104 is the average concentration, the ammonia concentration is low, and the flue gas temperature at the outlet of the heat recovery unit 104 is 90° C. to 95° C., for example, ammonium chloride ($NH_4Cl$) is plotted in the gas region.

When the flue gas temperature at the outlet of the heat recovery unit 104 is 90° C. to 95° C., for example, and the ammonia concentration is high (e.g., 4 ppm or more) these conditions fall within the upper region from the boundary of solid phase precipitation as illustrated in FIG. 3, and solid phase precipitation of ammonium chloride occurs in the heat recovery unit 104.

Figure 5:
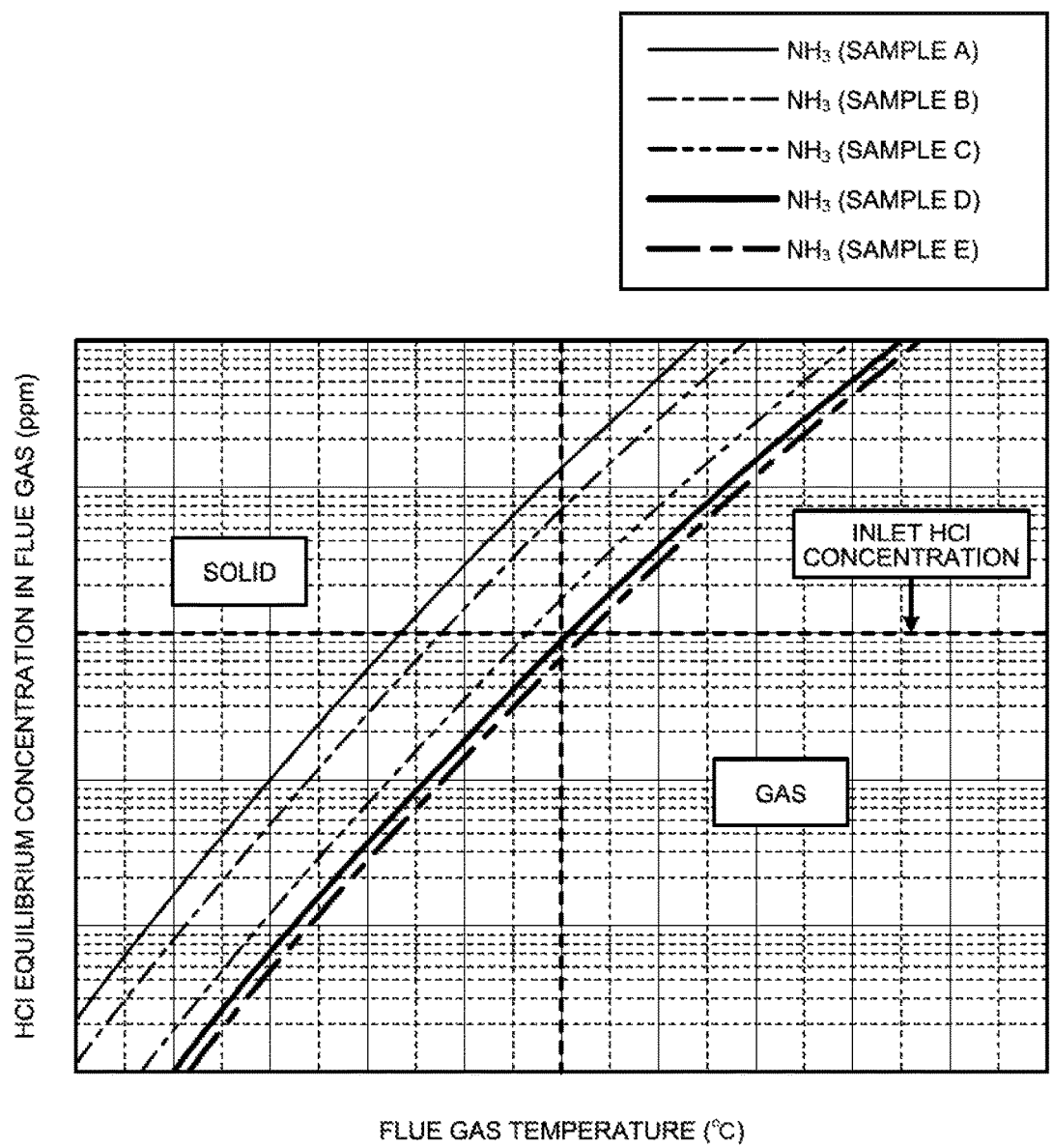
FIG. 5 is a diagram illustrating a relation between a flue gas temperature (° C.) and an equilibrium concentration (ppm) of hydrogen chloride (HCl) in flue gas in relation to a change in ammonia concentration.

The following describes a relation between a threshold of the ammonium concentration causing the sticking of ammonium chloride and the hydrogen chloride concentration. FIG. 5 is a diagram illustrating a relation between the flue gas temperature (° C.) and the equilibrium concentration (ppm) of hydrogen chloride (HCl) in flue gas in relation to a change in ammonia concentration. In FIG. 5, a change in solid region and gas region is illustrated in relation to each of samples A to E having different ammonia concentrations (e.g., in a range from 1 ppm to 20 ppm).

A gas temperature region in the heat recovery unit 104 is approximately from 95° C. to 150° C. When the gas temperature is set to an environment of near 100° C., a threshold of the ammonium concentration causing ammonium chloride to be formed (what is called sticking to the heat transfer tube 115) can be determined from FIG. 5 on the basis of the past case where the gas temperature region when ammonium chloride had been stuck to the heat transfer tube 115 was a low temperature region (95° C. to 105° C.).

In FIG. 5, the calculation is made using the hydrogen chloride concentration (10 ppm to 20 ppm) generally contained in flue gas. In a practical plant, an estimated value based on a chlorine concentration in coal serving as fuel used in the plant can be substituted as the hydrogen chloride concentration. The hydrogen chloride concentration is calculated from the Cl concentration value of fuel as the hydrogen chloride concentration of the flue gas $G_1$ at the outlet of the denitration device 102. The hydrogen chloride concentration is measured using a hydrogen chloride (HCl) meter in some cases.

In the embodiment, for preliminarily preventing an increase in gas differential pressure in the heat recovery unit 104 due to the sticking of a product composed of ammonium chloride to the heat transfer tube 115 in the heat recovery unit 104, the ammonia ($NH_3$) meter 200 is installed that measures the ammonium concentration in the flue gas at the outlet of the denitration device 102, and the control device 201 commands control of an increase in temperature of the heat medium 83 circulating in the heat recovery unit 104 on the basis of the measurement value of the ammonia concentration detected by the ammonia meter 200, thereby causing the gas temperature of an inner environment of the heat recovery unit 104 to be out of the ammonium chloride production temperature region. As a result, ammonium chloride can be prevented from sticking to the heat transfer tube 115 in the heat recovery unit 104 during plant operation.

As a result of reduction in production of ammonium chloride, sticking of a product composed of ammonium chloride to the heat transfer tube 115 is reduced. Consequently, this can prevent an increase in gas differential pressure in the heat transfer tube 115 in the heat recovery unit 104.

Figure 6:
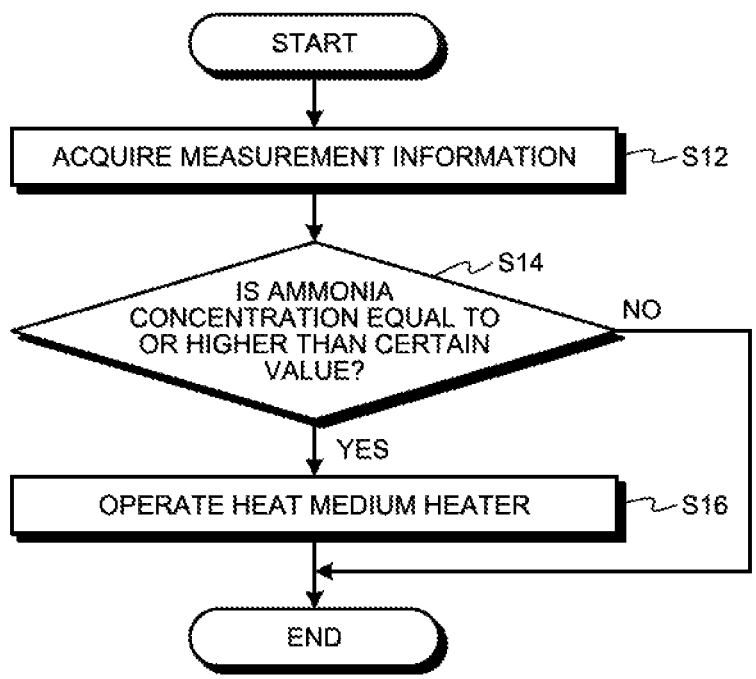
FIG. 6 is a flowchart illustrating an example of a control operation of the air pollution control system.

The following describes an example of processing of the air pollution control system with reference to FIG. 6. FIG. 6 is a flowchart illustrating an example of a control operation of the air pollution control system. The air pollution control system repeatedly performs the processing illustrated in FIG. 6 during the operation of the power generation plant. For example, the air pollution control system performs the processing illustrated in FIG. 6 at a certain time interval or at every time measurement information is acquired.

The control device 201 acquires the measurement information at step S12. The control device 201 acquires the results of measurement by the ammonia meter 200 and the gas temperature meter via communication. A hydrogen chloride concentration (hereinafter described as an "HCl concentration") 202 is based on calculation data from the Cl concentration value of the fuel or on measurement data from the hydrogen chloride (HCl) meter.

After acquiring the measurement information at step S12, the control device 201 determines whether the ammonia concentration is equal to or higher than a certain value at which ammonium chloride precipitates in solid phase from the ammonia concentration, the HCl concentration 202, and the gas temperature of the flue gas $G_2$ at step S14. If it is determined that the ammonia concentration is the concentration at which ammonium chloride precipitates in solid phase (Yes at step S14), the control device 201 outputs a command to operate the heat medium heater 86 at step S16, and thereafter ends the processing. If it is determined that the ammonia concentration is not the concentration at which ammonium chloride precipitates in solid phase (No at step S14), the control device 201 ends the processing.

The control device 201 can promptly detect whether ammonium chloride precipitates in solid phase by performing the processing illustrated in FIG. 6 every time the control device 201 acquires the measurement, information (states of operation parameters relating to the production of ammonium chloride). When it is detected that the ammonia concentration is the concentration at which ammonium chloride precipitates in solid phase, the heat medium heater 86 is caused to be operated to increase the inner temperature of the heat recovery unit 104, thereby making it possible to prevent the production of ammonium chloride.

The control device 201 can perform the processing illustrated in FIG. 6 using various detection units. When detecting whether ammonium chloride precipitates in solid phase using parameters of the detection results of the ammonia meter 200 measuring the ammonia concentration and a thermometer, and the HCl concentration 202, i.e., states of the operation parameters relating to the production of ammonium chloride, the control device 201 can determine whether ammonium chloride precipitates in solid phase on the basis of the relation illustrated in FIG. 5, i.e., by performing the determination on the basis of the equilibrium reaction condition.

As described above, the air pollution control system detects the state of ammonia concentration, i.e., whether ammonium chloride precipitates in solid phase. When the ammonia concentration is equal to or higher than a certain value, the air pollution control system causes the temperature of the heat medium 83 circulating in the heat recovery unit 104 to be increased by the adjustment of the heat medium heater 86 so as to increase the gas temperature in the heat recovery unit 104, thereby making it possible to prevent the production of ammonium chloride.

Second Embodiment

Figure 7:
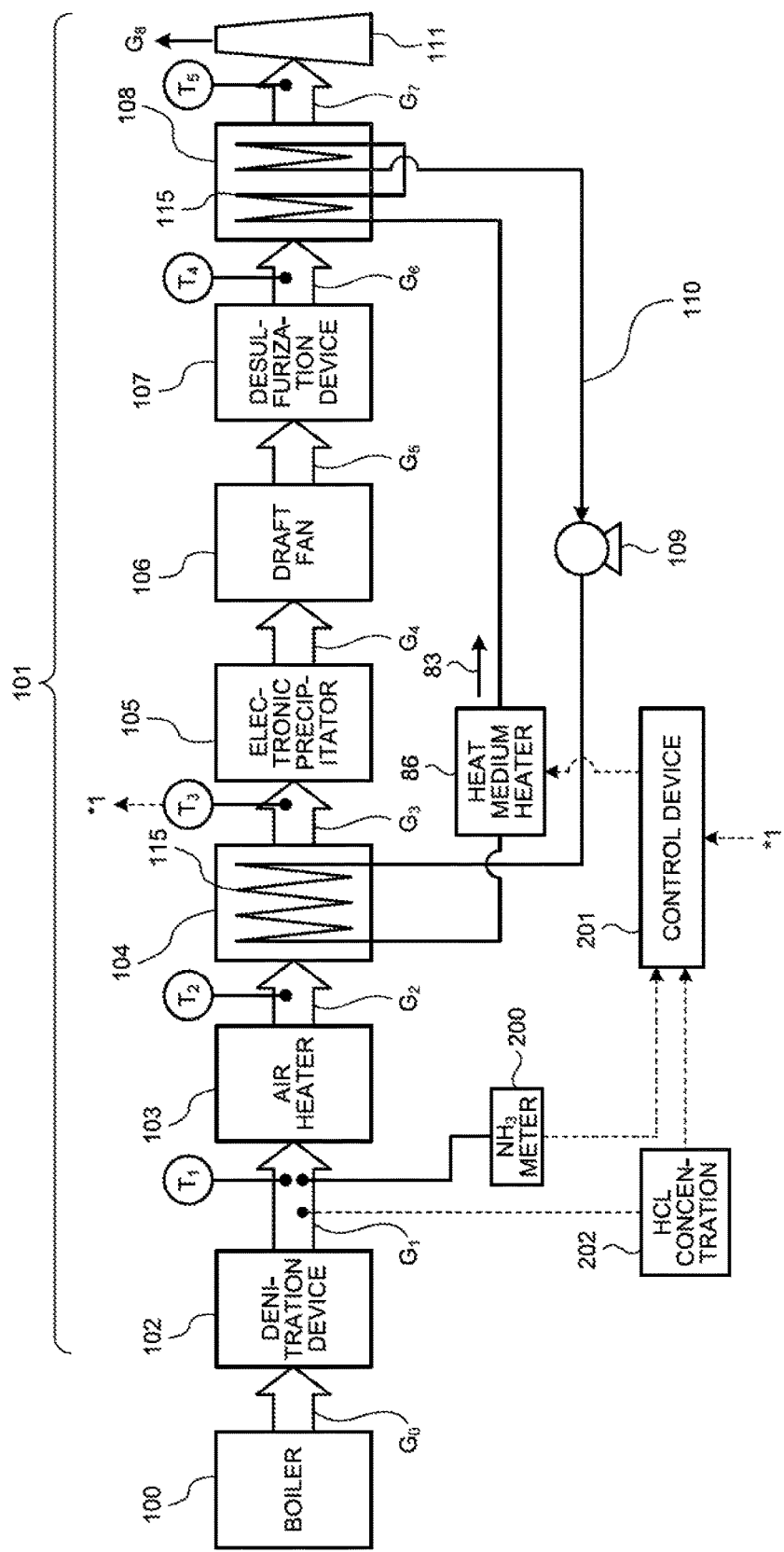
FIG. 7 is a schematic diagram of the air pollution control system according to a second embodiment.

FIG. 7 is a schematic diagram of the air pollution control system according to a second embodiment. As illustrated in FIG. 7, a gas thermometer that measures the gas temperature $T_3$ of the flue gas $G_3$ at the outlet of the heat recovery unit 104 is further provided in the air pollution control system in the first embodiment. The control device 201 can control the heat medium heater 86 such that the gas temperature $T_3$ of the flue gas $G_3$ flowing into the electronic precipitator 105 is an appropriate operating temperature of the electronic precipitator 105.

When the heat medium 83 is heated by the heat medium heater 86, the temperature of the heat medium 83 introduced into the heat recovery unit 104 is increased. In a case where the low temperature electronic precipitator 105 is used as the precipitator, the upper limit value of the operating temperature is about 120° C. The operation of the heat medium heater 86 is, thus, controlled such that the gas temperature $T_3$ is maintained under the upper limit value. As a result, the low temperature electronic precipitator 105 can be appropriately and continuously operated.

Third Embodiment

Figure 8:
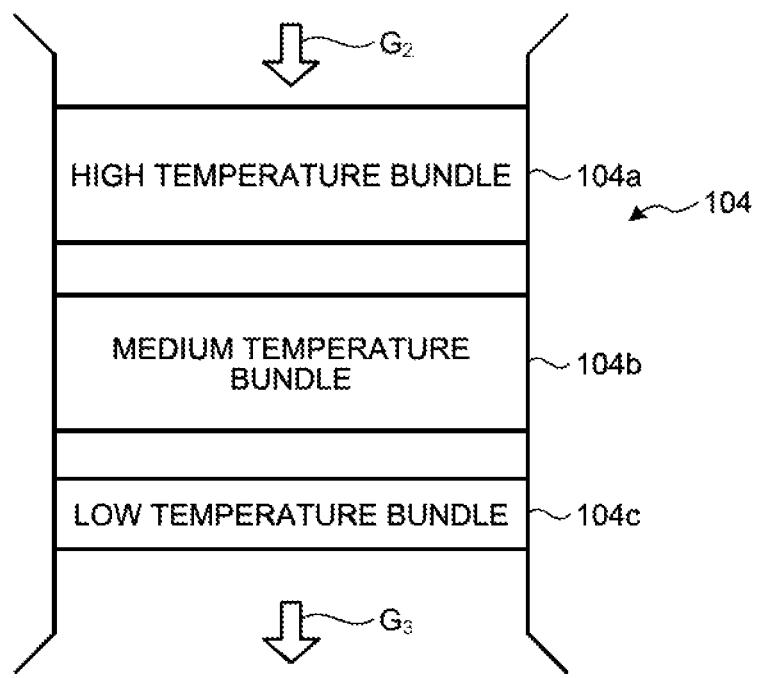
FIG. 8 is a schematic diagram of a structure of a heat recovery unit.

FIG. 8 is a schematic diagram of a structure of the heat recovery unit. As illustrated in FIG. 8, the heat transfer tube is bundled inside the heat recovery unit 104.

The heat transfer tube is separated into three bundles, i.e., a high temperature bundle 104a, a medium temperature bundle 104b, and a low temperature bundle 104c from a flue gas inlet side, for example. In the three separated bundles, a temperature of gas passing through the heat transfer tube 115 in the low temperature bundle 104c is in a lower temperature region than that of gas passing through the heat transfer tube 115 in the high temperature bundle 104a as a result of heat exchange.

The control device 201 includes a soot and dust removal device configured to remove soot and dust sticking to the heat transfer tube of the heat recovery unit 104 in addition to the control of the heat medium heater 86 in the first embodiment, to control the heat medium heater 86 and command operation of the soot and dust removal device.

Figure 9:
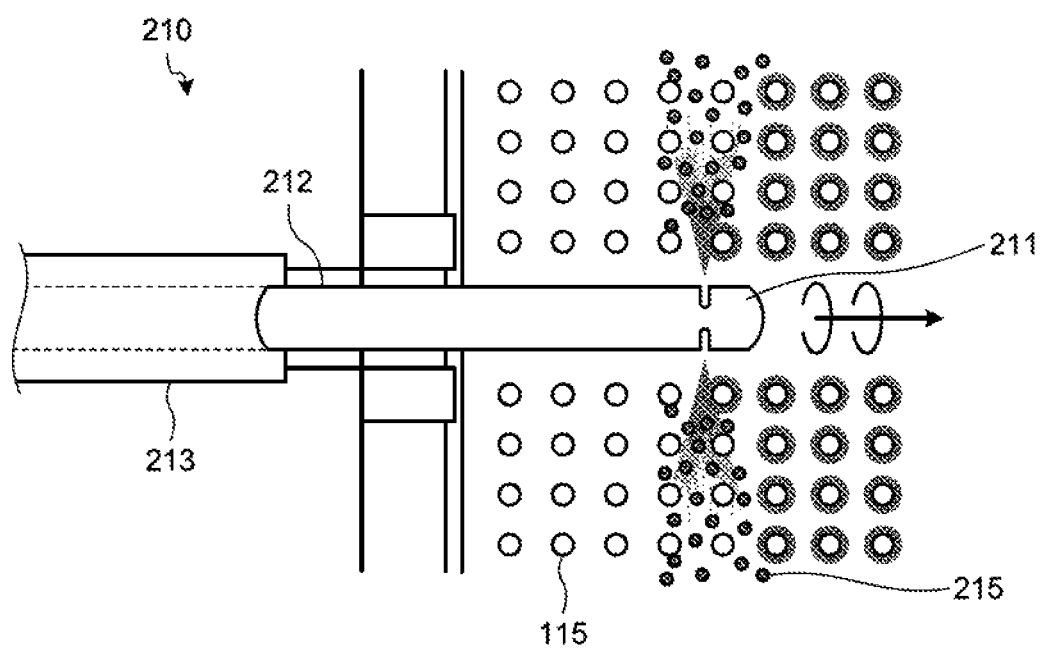
FIG. 9 is a schematic diagram illustrating removal of products in the heat recovery unit by a soot blower.

FIG. 9 is a schematic diagram illustrating removal of products in the heat recovery unit by a soot blower. As illustrated in FIG. 9, a soot blower 210 serving as the soot and dust removal device is installed in the heat transfer tube 115 in the low temperature bundle 104c. The soot blower 210 is composed of a lance tube 212 provided with a nozzle 211 at the tip thereof and a housing 213 that houses the lance tube 212 such that the lance tube 212 is attached in a detachable manner. Products 215 composed of ammonium chloride sticking to the heat transfer tube 115 in the low temperature bundle 104c can be removed by steam or compressed air jetted from the nozzle 211.

The following describes another example of the processing of the air pollution control system with reference to FIG. 10. FIG. 10 is a flowchart illustrating another example of the control operation of the air pollution control system. The air pollution control system repeatedly performs the processing illustrated in FIG. 10 during the operation of the power generation plant. For example, the air pollution control system performs the processing illustrated in FIG. 10 at a certain time interval or at every time when measurement information is acquired.

The control device 201 acquires the measurement information at step S22. The control device 201 acquires the results of measurement by the ammonia meter 200 and the gas temperature meter via communication. The HCl concentration 202 is calculation data from the Cl concentration value of the fuel or measurement data from the hydrogen chloride (HCl) meter.

After acquiring the measurement information at step S22, the control device 201 determines whether the ammonia concentration is equal to or higher than a certain value at which ammonium chloride precipitates in solid phase from the ammonia concentration, the HCl concentration, and the gas temperature of the flue gas $G_2$ at step S24. If it is determined that the ammonia concentration is the concentration at which ammonium chloride precipitates in solid phase (Yes at step S24), the control device 201 outputs a command to operate the heat medium heater 86 and a command to operate the soot blower at step S26, and thereafter ends the processing. If it is determined that the ammonia concentration is not the concentration at which ammonium chloride precipitates in solid phase (No at step S24), the control device 201 ends the processing.

The control device 201 can promptly detect whether ammonium chloride precipitates in solid phase by performing the processing illustrated in FIG. 10 every time the control device 201 acquires the measurement information (states of operation parameters relating to the production of ammonium chloride). When it is detected that the ammonia concentration is the concentration at which ammonium chloride precipitates in solid phase, the heat medium heater 86 is caused to be operated to increase the inner temperature of the heat recovery unit 104, thereby making it possible to prevent the production of ammonium chloride. The control device 201 causes the soot blower 210 to operate such that the nozzle 211 jets steam or compressed air in addition to causing the heat medium heater 86 to operate. The heat medium heater 86 is operated to increase an inner temperature of the heat, recovery unit 104, thereby preventing the production of ammonium chloride. In addition, the soot blower 210 is operated, thereby making it possible to remove the products 215 composed of ammonium chloride sticking to the heat transfer tube 115 in the bundle.

When the ammonia concentration is increased in the first embodiment, in the third embodiment, the soot blower 210 is additionally operated so as to prevent soot and dust caused by the products 215 from sticking to the heat transfer tube 115 and to remove the soot and dust. Consequently, this can prevent an increase in gas differential pressure.

As described above, when it is determined that the ammonia concentration is equal to or higher than a certain value on the basis of the measurement result of the ammonia concentration detected by the ammonia meter 200 on a front side (e.g., the outlet of the denitration device 102) of the heat recovery unit 104, the heat medium heater 86 is operated and the soot blower 210 is immediately operated. This makes it possible to preliminarily prevent an increase in gas differential pressure in the heat recovery unit 104 due to the sticking of the products 215 composed of ammonium chloride to the heat transfer tube 115 in the heat recovery unit 104.

As illustrated in FIG. 8, the operation of the soot blower 210 is concentrated to the low temperature bundle 104c, which is in a low temperature region where sticking of ammonium, chloride occurs, thereby making it possible to prevent ammonium chloride from sticking to the heat transfer tube 115 in the low temperature bundle 104c during plant operation.

When the ammonia concentration, which is a condition of the precipitation of ammonium chloride, at the outlet of the denitration device 102 indicates the certain value, the operation frequency of the soot blower 210 is increased to remove the products 215 composed of ammonium chloride, thereby making it possible to prevent ammonium chloride from sticking to the heat transfer tube 115.

REFERENCE SIGNS LIST

83 Heat medium
86 Heat medium heater
87 Steam
100 Boiler
101 Air pollution control system
111 Stack
102 Denitration device
103 Air heater
104 Heat recovery unit
105 Electronic precipitator
106 Draft fan
107 Desulfurization device
100 Reheater
109 Circulation pump
110 Heat medium circulation pipe
111 Stack
200 Ammonia ($NH_3$) meter
201 Control device
202 HCl concentration

The invention claimed is:

1. An air pollution control system, comprising:
   a denitration device configured to remove nitrogen oxide in flue gas from a boiler;
   a heat recovery unit including a heat transfer tube for recovering part of heat of the flue gas after denitration;
   a precipitator configured to remove soot and dust in the flue gas after heat recovery;
   a desulfurization device configured to remove sulfur oxide in the flue gas discharged from the precipitator;
   a reheater including a heat transfer tube for heating the flue gas discharged from the desulfurization device;
   a heat medium circulation pipe including a heat medium circulation pump configured to circulate a heat medium between the heat transfer tube of the heat recovery unit and the heat transfer tube of the reheater;
   a heat medium heater provided to the heat medium circulation pipe to heat the heat medium;
   a detection device configured to detect a state of ammonia at an outlet of the denitration device;
   a control device configured to control the heat medium heater based on a value of an ammonia concentration detected by the detection device; and
   a gas thermometer configured to measure a gas temperature of the flue gas at an outlet of the heat recovery unit, wherein
   the control device is configured to cause the heat medium heater to heat the heat medium when the ammonia concentration is equal to or higher than a certain value, and
   control operation of the heat medium heater such that the gas temperature of the flue gas is maintained under an upper limit value of operating temperature of the precipitator.

2. The air pollution control system according to claim 1, wherein the detection device obtains an ammonia concentration in the flue gas at the outlet of the denitration device.

3. The air pollution control system according to claim 1, wherein the detection device obtains an input amount of ammonia to be supplied to the denitration device.

4. The air pollution control system according to claim 1, wherein the detection device detects a switching of a setting value for inputting ammonia into the flue gas.

5. The air pollution control system according to claim 1, further comprising a soot and dust removal device configured to remove soot and dust sticking to the heat transfer tube of the heat recovery unit, wherein
the control device commands operation of the soot and dust removal device while controlling the heat medium heater.

* * * * *